United States Patent
Mantri et al.

(10) Patent No.: US 9,384,008 B1
(45) Date of Patent: Jul. 5, 2016

(54) METHOD AND SYSTEM FOR OPERATING SYSTEM RECOVERY FROM A NETWORK DEVICE INCLUDING USER SELECTABLE OPTIONS FOR STORING AN OS IMAGE IN LOCAL STORAGE OF A CACHING DEVICE

(71) Applicant: QLOGIC, Corporation, Aliso Viejo, CA (US)

(72) Inventors: Neeraj Mantri, Udaipur (IN); Nilekh Kumar, Bihar (IN); Sangram Singh Shekhawat, Pune (IN)

(73) Assignee: QLOGIC, Corporation, Aliso Viejo, CA (US)

( * ) Notice: Subject to any disclaimer, the term of this patent is extended or adjusted under 35 U.S.C. 154(b) by 172 days.

(21) Appl. No.: 14/230,768

(22) Filed: Mar. 31, 2014

(51) Int. Cl.
*G06F 11/14* (2006.01)
*G06F 9/44* (2006.01)
*G06F 3/06* (2006.01)
*H04L 29/08* (2006.01)

(52) U.S. Cl.
CPC ............ *G06F 9/441* (2013.01); *G06F 3/065* (2013.01); *G06F 3/067* (2013.01); *G06F 3/0619* (2013.01); *G06F 11/1415* (2013.01); *H04L 67/2842* (2013.01)

(58) Field of Classification Search
CPC . H04L 67/1095; H04L 67/1097; H04L 67/28; H04L 67/2842; H04L 67/2847; H04L 67/2852; H04L 67/2857; H04L 67/2866; H04L 67/2871; G06F 11/1415
See application file for complete search history.

(56) References Cited

U.S. PATENT DOCUMENTS

| | | | | |
|---|---|---|---|---|
| 6,839,746 | B1 * | 1/2005 | Muthiyan | ............... H04L 29/06 709/220 |
| 2004/0172578 | A1 * | 9/2004 | Chen | ................... G06F 11/1417 714/15 |
| 2004/0221194 | A1 * | 11/2004 | Denninghoff | ......... G06F 9/4406 714/11 |
| 2011/0145307 | A1 * | 6/2011 | Ananthanarayanan | G06F 17/30132 707/827 |
| 2012/0254509 | A1 * | 10/2012 | Cleveland | ........... G06F 12/0246 711/103 |

\* cited by examiner

*Primary Examiner* — Joseph Schell
(74) *Attorney, Agent, or Firm* — Klein, O'Neill & Singh, LLP

(57) ABSTRACT

Methods and systems for a network device are provided. The network device includes a storage protocol controller having a port for interfacing with a storage area network (SAN) based storage device; a processor executing instructions for managing a local storage device that is configured to operate as a caching device for a computing device. The local storage device is used to store a recovery copy of an operating system of the computing device, where the recovery copy is accessible via a processor executable basic/input output (BIOS) utility.

17 Claims, 6 Drawing Sheets

METHOD AND SYSTEM FOR OPERATING SYSTEM RECOVERY FROM A NETWORK DEVICE INCLUDING USER SELECTABLE OPTIONS FOR STORING AN OS IMAGE IN LOCAL STORAGE OF A CACHING DEVICE

TECHNICAL FIELD

The present disclosure relates to computing system and methods associated with recovering a corrupt operating system.

BACKGROUND

A computer network, often simply referred to as a network, is a group of interconnected computers and devices that facilitates communication among users and allows users to share resources. Adapters, switches and other devices are typically used during network communication for reading and writing data at mass storage devices.

Computing devices (or systems) use an operating system for managing overall computing device operations. It is desirable to have a redundant copy of the operating system in case an original version becomes corrupt. Continuous efforts are being made to efficiently provide access to operating system copies.

BRIEF DESCRIPTION OF THE DRAWINGS

The various present embodiments relating to the management of network elements now will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

Figure 1A:
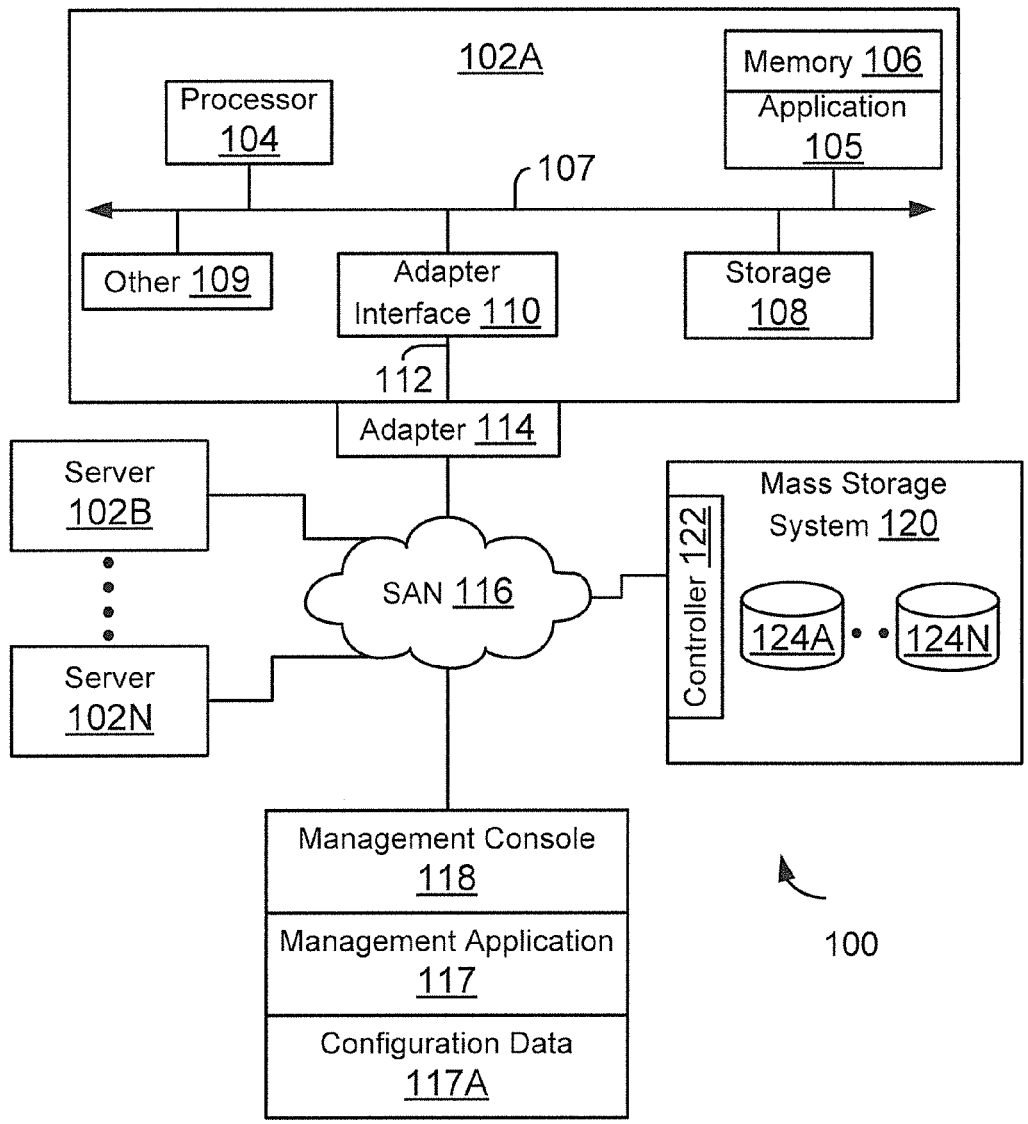
FIG. 1A is a functional block diagram of a system, used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer," "system," and "functionality" represent executable instructions that perform specified tasks when executed on a hardware based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein may be implemented as a computer process (method), a computing system, or as an article of manufacture, such as a computer program product or computer-readable media. The computer program product may be non-transitory, computer storage media, readable by a computer device, and encoding a computer program of instructions for executing a computer process. The computer program product may also be readable by a computing system, and encoding a computer program of instructions for executing a computer process.

In one embodiment, an adapter, for example, a network device is provided. The adapter includes a storage protocol controller having a port for interfacing with a storage area network (SAN) based storage device and another adapter operating within a cluster is provided. The adapter includes a processor executing instructions for managing a local storage device that is configured to operate as a caching device for a computing device. The adapter operates as a host bus adapter and a storage controller for managing storage space at the local storage device and the SAN-based storage device.

System 100:

FIG. 1A is a block diagram of a system 100 configured for use with the present embodiments. System 100 may include a plurality of computing systems 102A-102N (may also be referred to as server (s) 102 or host system 102), each coupled to an adapter 114 (also referred to as an intelligent storage adapter (ISA) 114) that interfaces with other devices and ISAs, as described below in more detail.

The computing system 102A may include one or more processors 104, also known as central processing units (CPUs). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 104 executes machine implemented instructions (or process steps/blocks) out of a memory 106 and interfaces with an interconnect 107 that may be referred to as a computer bus 107. The computer bus 107 may be, for example, a system bus, a Peripheral Component Interconnect (PCI) bus, PCI-Express (PCIe) bus, a HyperTransport or industry standard architecture (ISA) bus, a SCSI bus, a universal serial bus (USB), an Institute of Electrical and Electronics Engineers (IEEE) standard 1394 bus (sometimes referred to as "Firewire®"), or any other type of bus.

The computing system 102A may further include a storage device 108, which may be for example a hard disk, a CD-ROM, a non-volatile memory device (flash or memory stick) or any other storage device for storing structured or unstructured data. Storage 108 may store operating system program files (or data containers), application program files, for example, email applications, database applications, management applications, and other application files. Some of these files are stored on storage 108 using an installation program. For example, the processor 104 may execute computer-executable process steps of an installation program so that the processor 14 can properly execute the application program.

In one embodiment, storage device 108 may be a solid state storage device (may also be referred to herein as SSD 108). SSDs are becoming popular for servers that may need to store large amounts of data. ISA 114 described below in more detail may be used to manage and/or access storage device 108, according to one embodiment.

Memory 106 also interfaces with the computer bus 107 to provide the processor 104 with access to memory storage. Memory 106 may include random access main memory (RAM). When executing stored computer-executable process steps from storage 108, the processor 104 may store and execute the process steps out of memory 106. Read only memory (ROM, not shown) may also be used to store invariant instruction sequences, such as start-up instruction sequences or basic input/output system (BIOS) sequences for operation of a keyboard (not shown).

In one embodiment, processor 104 may execute an application 105 for performing certain functions. For example, application 105 may be a database application, a virtual machine executed in a virtual environment (provided by VMware Corporation, Microsoft Corporation or any other entity) electronic email application (for example, Microsoft Exchange) or any other application type. Application 105 may issue read and write requests that are processed by ISA 114, as described below in more detail. Application 105 may also be referred to as a "client".

The computing system 102A also includes other devices and interfaces 109, which may include a display device interface, a keyboard interface, a pointing device interface and others. The details of these components are not germane to the inventive embodiments.

ISA 114 may be configured to handle both network and storage traffic while interfacing with other elements. In one embodiment, as described below in detail, ISA 114 may be configured to provide the functionality of a host bus adapter (HBA) by providing connectivity to SAN (storage area network) based storage arrays as well as present logical storage from a local storage device connected to the ISA. Various network and storage protocols may be used to handle network and storage traffic, for example, Ethernet, Fibre Channel, Fibre Channel over Ethernet (FCoE), Internet over Small Computer System Interface (iSCSI), and others. Some of the common protocols are described below.

Ethernet is a common network protocol used for network communication. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates that are greater than 1 gigabit (Gb). The various embodiments described herein may use Ethernet (which includes 100 Base-T and/or Gigabit Ethernet) as the network protocol. However, the adaptive embodiments disclosed herein are not limited to any particular protocol, as long as the functional goals are met by an existing or new network protocol.

Fibre Channel (may also be referred to as "FC") is a common storage protocol used in SANs. Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a storage area network (SAN). This functionality would allow Fibre Channel to leverage high speed, for example, 10 Gigabit Ethernet networks while preserving the Fibre Channel protocol. In one embodiment, ISA 114 can be configured to operate as a FCOE adapter. Those of ordinary skill in the art will appreciate, however, that the present embodiments are not limited to any particular protocol.

iSCSI is an IP based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command or (control) data blocks (CDBs) to SCSI storage devices (may be referred to as targets) on remote servers. iSCSI is a SAN-based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure. In one embodiment, ISA 114 may operate as an initiator as well as a target for responding to input/output (referred to as I/O or "IO") requests for reading and writing information at storage devices.

Storage space at a storage device (local or SAN-based) is typically presented to application 105 as a logical entity referred to as a logical unit number (LUN). Each LUN is uniquely identified by an identifier (LUN ID) and is associated with physical storage space. A LUN has a size associated with it that may indicate the amount of storage space that is made available to a computing system and a drive letter that may be used to access the LUN.

A LUN is typically divided into logical block addresses (LBAs) that are used by application 105 to read and write data to storage locations. The LBAs are mapped with actual physical storage to read and write data. A LUN used by an application may be referred to as a data LUN. A LUN that is accessible via a SAN connection may be referred to as a SAN LUN. A LUN at a local storage device managed by ISA 114 may be referred to as "cache" LUN. A cache LUN may be used to cache data stored at a SAN LUN or another data LUN. The cache LUN is managed by ISA 114 and may not be visible to application 105.

Referring back to FIG. 1A, computing system 102 uses an adapter interface 110 to communicate with ISA 114 via a link 112. In one embodiment, link 112 may be a PCI-Express link or any other interconnect type. The adaptive embodiments disclosed herein are not limited to any particular link type.

ISA 114 may communicate and interface with a mass storage system 120 via a SAN 116 that may include one or more switches (may be referred to as fabric switch). The mass storage system 120 may include a plurality of storage devices 124A-124N. Storage space at storage devices 124A-124N may be presented as SAN LUNs to application 105 via SAN 116. Controller 122 of mass storage system 120 may be used to manage storage devices 124A-124N. In one embodiment, controller 122 may include a processor, an ISA 114 and other similar components.

System 100 may also include a management console 118, used according to one embodiment. Management console 118 may be a computer system similar to computing system 102A described above in detail. Management console 118 executes a management application 117 that may be used to configure storage space as logical structures (for example, as LUNs) that are presented to computing systems 102A-102N for storing information or as cache LUNs at local storage for caching information stored at SAN LUNs. Permissions associated with a LUN may also be configured using management application 117. The permissions indicate which entities may be allowed to access a LUN to read and/or write information. Management application 117 may store LUN attributes and permissions in a configuration data structure 117A at a storage location.

In one embodiment, ISA 114 is provided that can provide transparent data caching at SSDs while efficiently synchronizing the SSD data with SAN-based storage devices. The ISA enables management of data stored at the SSDs. The ISA also enables the SSDs to be shared as SAN storage allowing other servers 102B-102N to access data residing at SSDs in server 102A. ISA 114 may configure a LUN from the local storage 108 and present the LUN to servers 102A-102N, allowing the local storage 108 to be shared by other servers 102B-102N.

In another embodiment, ISA 114 provides traditional SAN connectivity to computing system 102A and to the SSDs at each computing system. The SSDs may be managed as a storage pool that may be configured to operate as a cache pool to cache read/write data for SAN LUNs presented to the computing systems. SAN LUNs when configured may be tagged with an attribute that allows caching at the local SSDs for read and/or write caching.

Figure 1B:
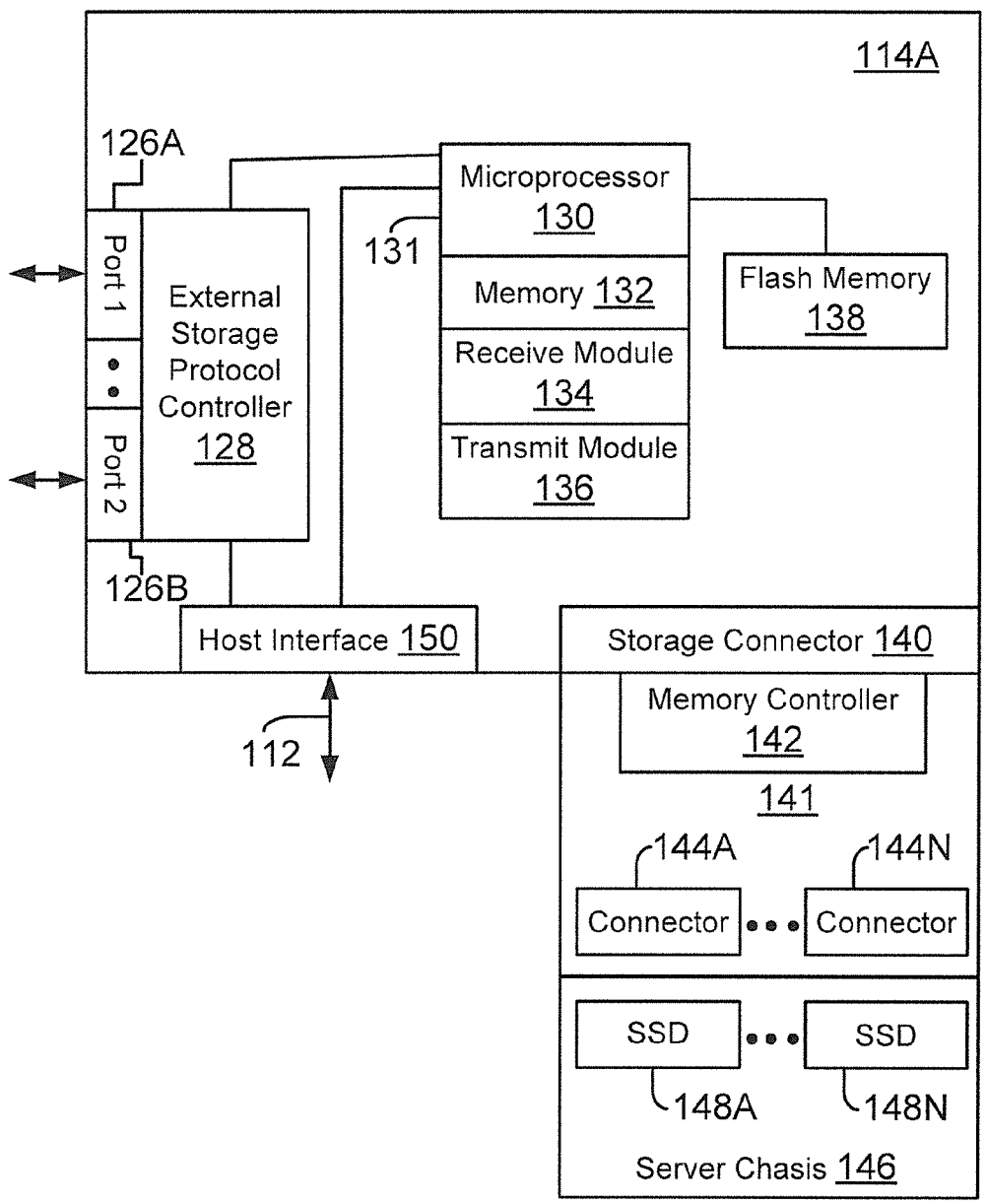
FIG. 1B shows an example of an intelligent storage adapter (ISA)

FIG. 1B shows an example of ISA 114A that includes a storage protocol controller 128 (shown as "external storage protocol controller") with ports 126A and 126B. The storage protocol controller may be a Fibre Channel controller (or application specific integrated circuit (ASIC)) that is available from QLogic Corporation for interfacing with Fibre Channel based storage devices via ports 126A/126B. Ports 126A/126B include logic and circuitry for sending and receiving Fibre Channel frames. Fibre Channel is simply shown as an example and the various embodiments disclosed herein are not limited to any particular storage/network protocol. Thus, ports 126A-126B are not limited to just Fibre Channel ports. Furthermore, although only two ports 126A and 126B are shown as an example, the adaptive embodiments disclosed herein are not limited to any particular number of ports.

Storage protocol controller 128 may operate as a host bus adapter for managing I/O requests for SAN-based storage. Storage protocol controller 128 is configured to process I/O requests for reading data from SAN-based storage (124A-124N) and writing data to SAN-based storage. Thus storage protocol controller 128 is used to take advantage of existing SAN infrastructure, while providing access to SSDs for computing systems 102A-102N.

In one embodiment, storage protocol controller 128 includes a processor (not shown) for executing a Fibre Channel stack having layers, FC0-FC4. FC0 is defined by the Fibre Channel specification as the physical layer, which includes cables (fiber optics, twisted-pair), connectors and others. FC1 layer is defined as the data link layer. This layer implements 8B/10B (8-bit to 10-bit) encoding and decoding of signals. FC2 layer is defined as the network layer. This layer defines the main Fibre Channel framing, addressing, and control protocols. FC3 layer is an auxiliary layer that provides common services like encryption or RAID related. FC4 layer is the protocol mapping layer where other protocols, such as SCSI are encapsulated into an information unit for delivery to FC2 and transmission across a Fibre Channel network. This layer provides flexibility to Fibre Channel as a networking technology compatible with other technologies.

ISA 114A also includes a host interface 150 that interfaces with processor 104 via link 112. The structure of host interface 150 will depend on the type of connection/interconnect used to communicate with processor 104. For example, if a PCI-Express link is used to communicate with processor 104, then host interface 150 includes logic and circuitry for receiving and sending PCI-Express packets/information.

ISA 114A includes a system on chip (SOC) 131 that includes a microprocessor 130 having access to an adapter memory (may also be referred to as local memory) 132. Processor 130 may be one or more programmable general-purpose or special-purpose microprocessors, digital signal processors (DSPs), programmable controllers, application specific integrated circuits (ASICs), reduced instruction set computer (RISC), programmable logic devices (PLDs), or the like, or a combination of such hardware devices. Memory 132 may be used to store firmware instructions and various data structures for ISA 114A for controlling overall ISA 114A operations. Memory 132 may also store instructions for implementing the various embodiments described herein.

SOC 131 may also include a receive module 134 and a transmit module 136. The receive module 134 may be used to store packets that are received via ports 126A/126B, while transmit module 136 may be used to store information that is transmitted via ports 126A/126B or to local SSDs that are described below. Receive module 134 and/or transmit module 136 may be separate modules and may include more than one component for processing received information or information that is transmitted.

ISA 114A may also include a non-volatile memory 138 (shown as flash memory) for storing parameters/instructions that may be used by microprocessor 130 for executing the instructions described below in detail. ISA 114A also includes a storage connector 140 that interfaces with another card 141 (may also be referred to as a daughter card 141), according to one embodiment. In one embodiment, the storage connector may be a PCI-Express connector, PCI connector or any other connector type based on the interconnect used by SOC 131 to interface with the SSDs. The daughter card 141 includes a memory controller 142 that interfaces with a plurality of connectors 144A-144N. The plurality of connectors 144A-144N are used to plug in SSDs 148A-148N (similar to storage 108). In this embodiment, SSDs 148A-148N are included within a server chassis 146. In one embodiment, connectors 144A-144N may be Serial Advanced Technology Attachments (or Serial ATA or SATA) for receiving SSDs 148A-148N. In another embodiment, connectors 144A-144N may be Serial Attached SCSI (or SAS) connectors.

ISA 114A has SAN connectivity because of ports 126A-126B, similar to a host bus adapter, as mentioned above. The storage protocol controller 128 allows SAN storage based processing. Unlike conventional HBAs, ISA 114A also includes a storage connector 140 that provides local storage solutions via SSDs 148A-148N.

In another embodiment, ISA 114A is configured such that a daughter card has the SSDs 148A-148N on the card itself, rather than on the server chassis 146. In another embodiment, ISA 114A is configured such that the memory controller 142 is on the same card as the other components of ISA 114A. The SSDs 148A-148N are also on the same card connected via one or more storage connectors.

Figure 1C:
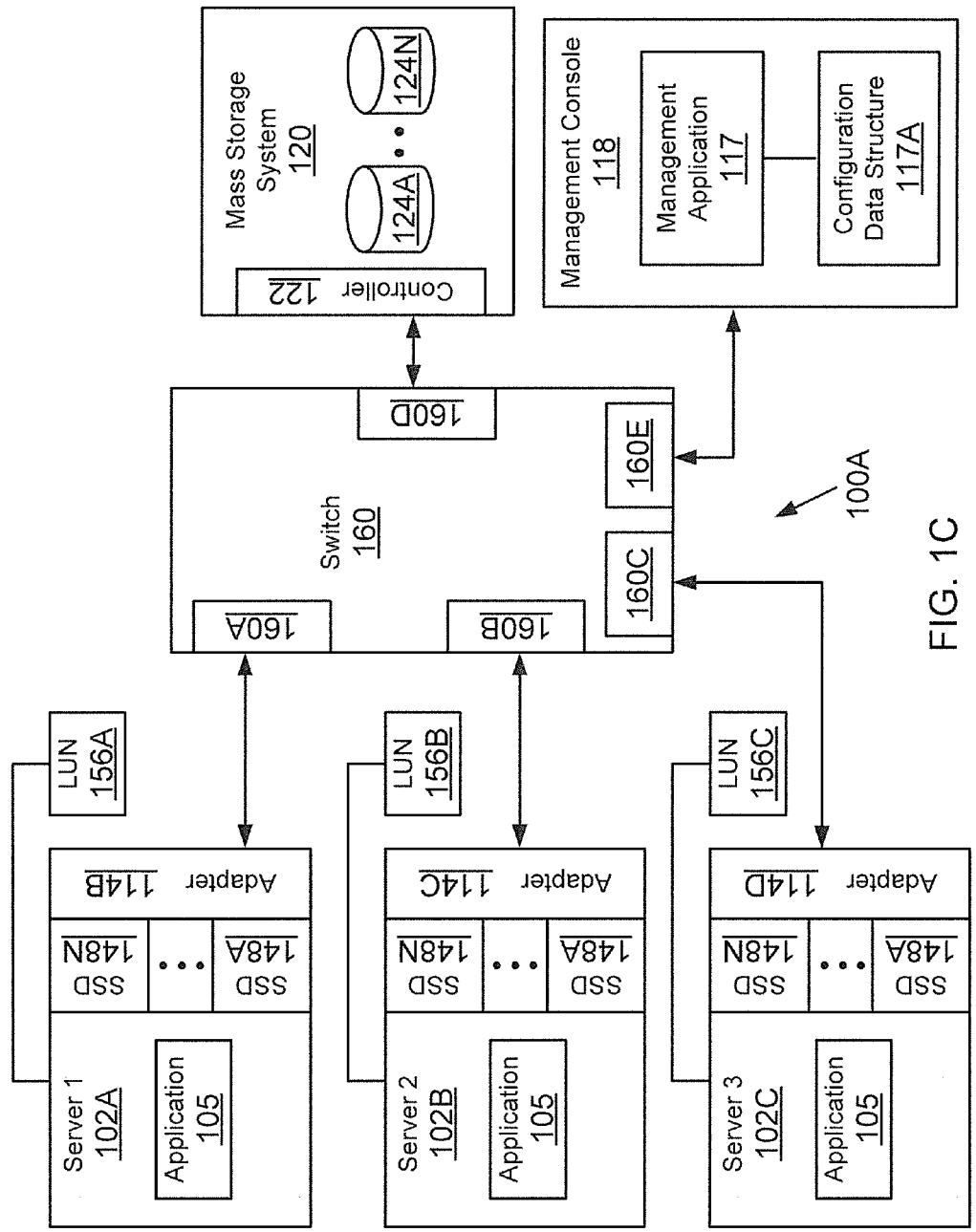
FIG. 1C shows an example of a configuration for using the ISAs, according to one embodiment.

FIG. 1C shows a system 100A where each ISA 114B-114D (similar to ISA 114A described above) in servers 102A-102C are coupled to a fabric switch 160, according to one embodiment. Fabric switch 160 includes a plurality of ports 160A-160E. Ports 160A-160C are coupled to ISA 114B-114D ports, respectively, while port 160D is coupled to controller 122 of the mass storage system 120. Management console 118 may be coupled to port 160E for configuring various components of system 100A.

Management console 118 may also be used to configure LUNs 156A-156N that are presented to servers 102A-102N for storing information. The LUNs may be based on storage located at SAN-based storage 120 or at a local SSD 148A-148N.

The LUNs 156A-156N may be configured to operate as a local LUN. In this configuration, the LUN may be used as a "boot" LUN. The LUN may be used by the host computing system to which it is presented. One or more ISAs may present the boot LUN to any of the servers that are served by a cluster of ISAs. LUNs 156A-156N may also be configured as a SAN mirror LUN. In such configuration, the LUN is a mirror of a LUN that is associated with a SAN-based storage device. LUNs 156A-156N may also be configured as Peer Mirror LUN. In such a configuration, the LUN is mirrored across at least two ISAs and hence can be made accessible to at least two servers.

The LUNs 156A-156C may also be accessible by one or more servers via SAN 116. In this example, a DAS (direct attached storage) based SSD becomes accessible as SAN storage, while the DAS based storage is still managed by an application 105 (for example, a database application).

In FIG. 1C, one embodiment of ISA 114B in server 102A acts as a storage protocol controller for LUN 156A, serving up LUN 156A to initiators ISA 114C in server 102B and ISA 114D in server 102C. At the same time, ISA 114B also acts as a traditional HBA (initiator) for SAN LUNs at SAN storage devices 124A-124N. In one embodiment, SSD 148 may be used to store an operating system (OS) for the host system.

Figure 2:
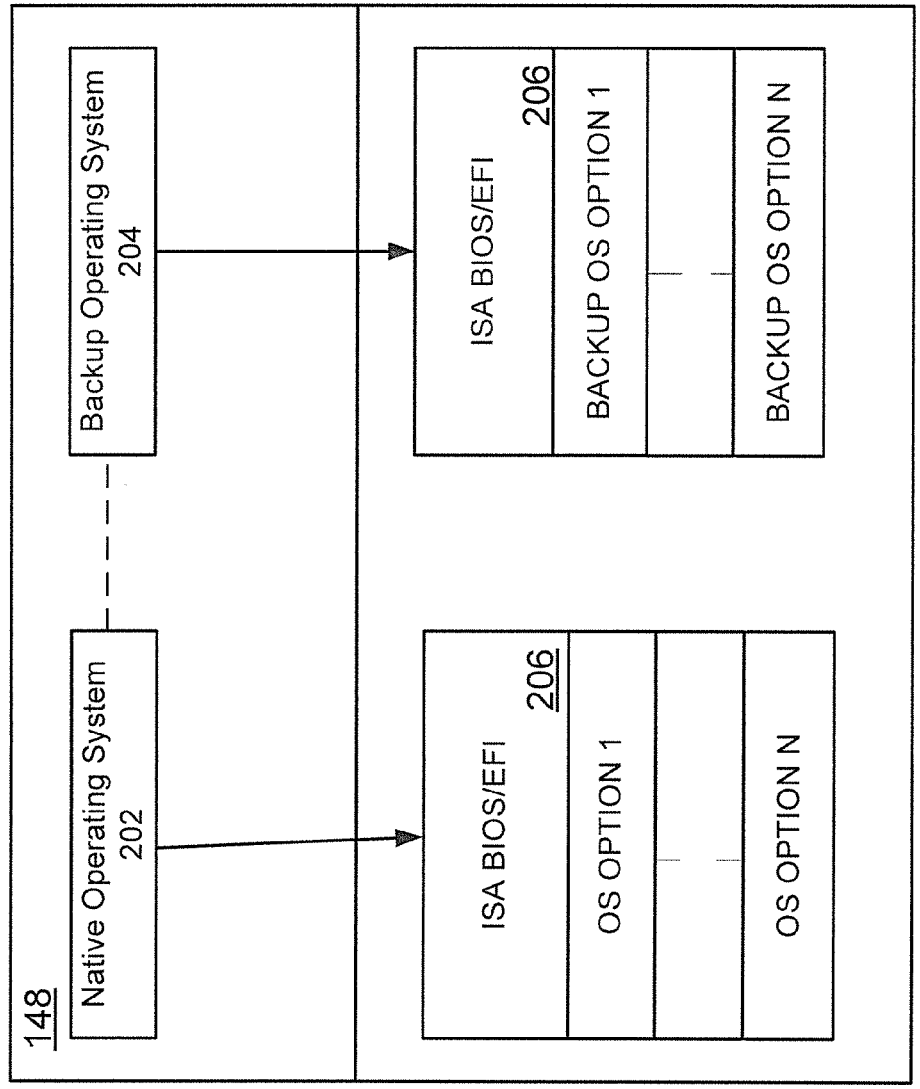
FIG. 2 shows an example of storing an operating system at a local cache managed by the ISA.

FIG. 2 shows an example of storing a native image of the operating system 202 at a first storage location and a back-up image 204 at a second storage location of SSD 148. The OS and the backup images are accessible via the basic input/output instructions (BIOS) of the ISA 114. BIOS 206 allows a user using a utility to select an option for storing the native image as well as for the backup image. For example, option 1 of the native image may be the latest operating system installation copy, a fully configured operating system or any other version. Option 1 for the backup copy may also be a clone of the latest copy of an installed operating system, a snapshot of a fully configured operating system, an image of a semi-configured operating system and so forth.

Figure 3:
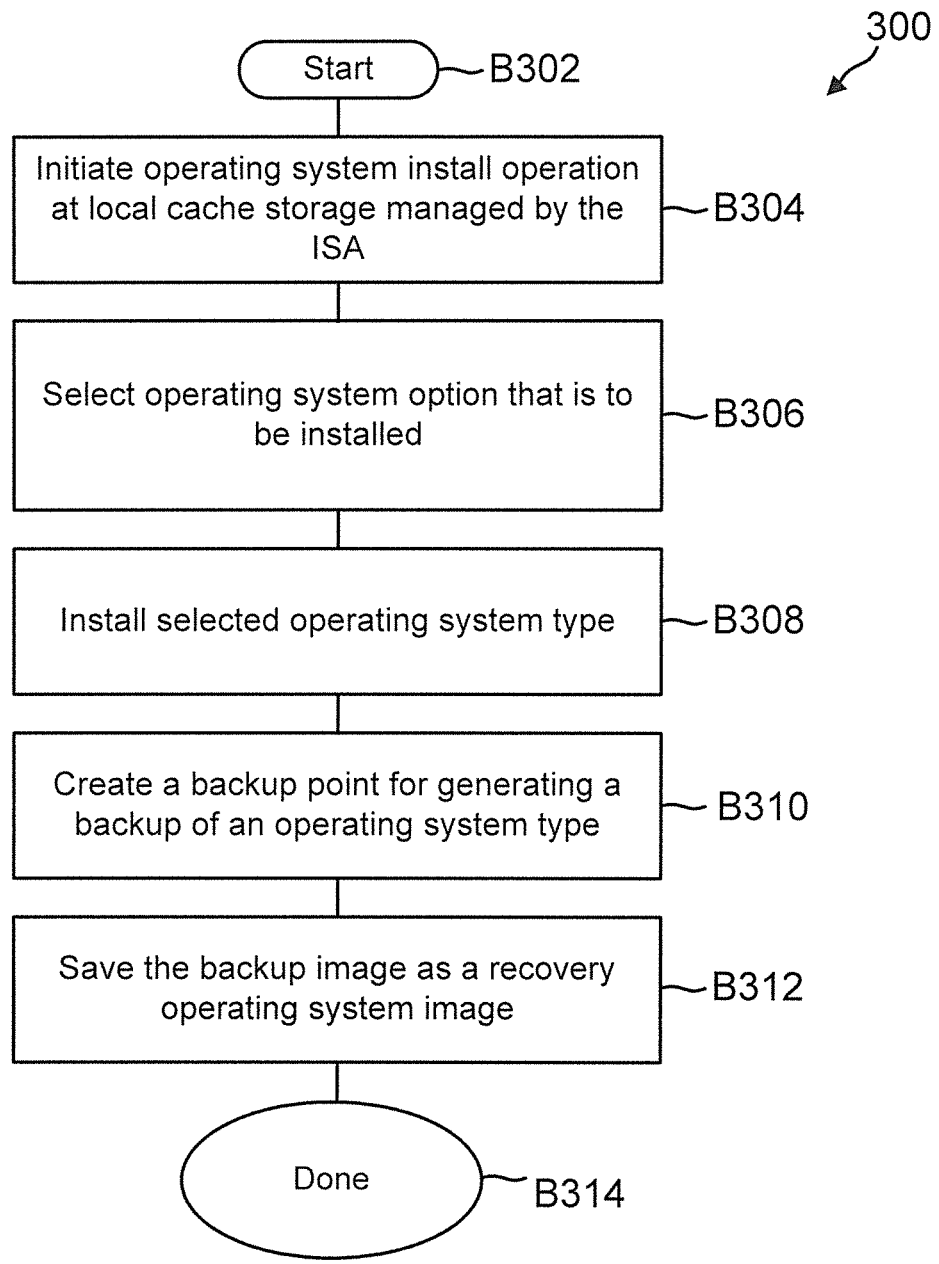
FIGS. 3 and 4 show process flow diagrams, according to one embodiment of the present disclosure.

FIG. 3 shows a process 300 for installing an operating system at SSD 148, according to one embodiment. The install process begins in block B302 and may be initiated by using a processor executable utility program that is presented to a user. The user interface may be a command line interface (CLI) or a graphical user interface (GUI). In block B304, the user initiates an operating system install operation at the local cache 148. The user chooses to use the local cache managed by the ISA 114 to store the copy of the operating system.

In block 306, the user selects one of the operating system options for storing the operating system image. The option includes a fresh installed copy of the operating system, a fully configured copy of the operating system that may include applications and other programs or any other configuration of the operating system.

In block B308, the selected configuration type is installed at the local cache 148. Thereafter in B310, a backup point i.e. a clone or snapshot of the image is generated. A clone is an exact copy of the operating system that is being installed at local cache 148. The clone can be modified snapshot is an image the current state of the operating system and is typically a read-only copy of the data. This can be incremental by capturing only changes from previous state and not the whole state again. Then, in block B312, the backed up copy is stored as a recovery copy and the process ends in block B314.

Figure 4:
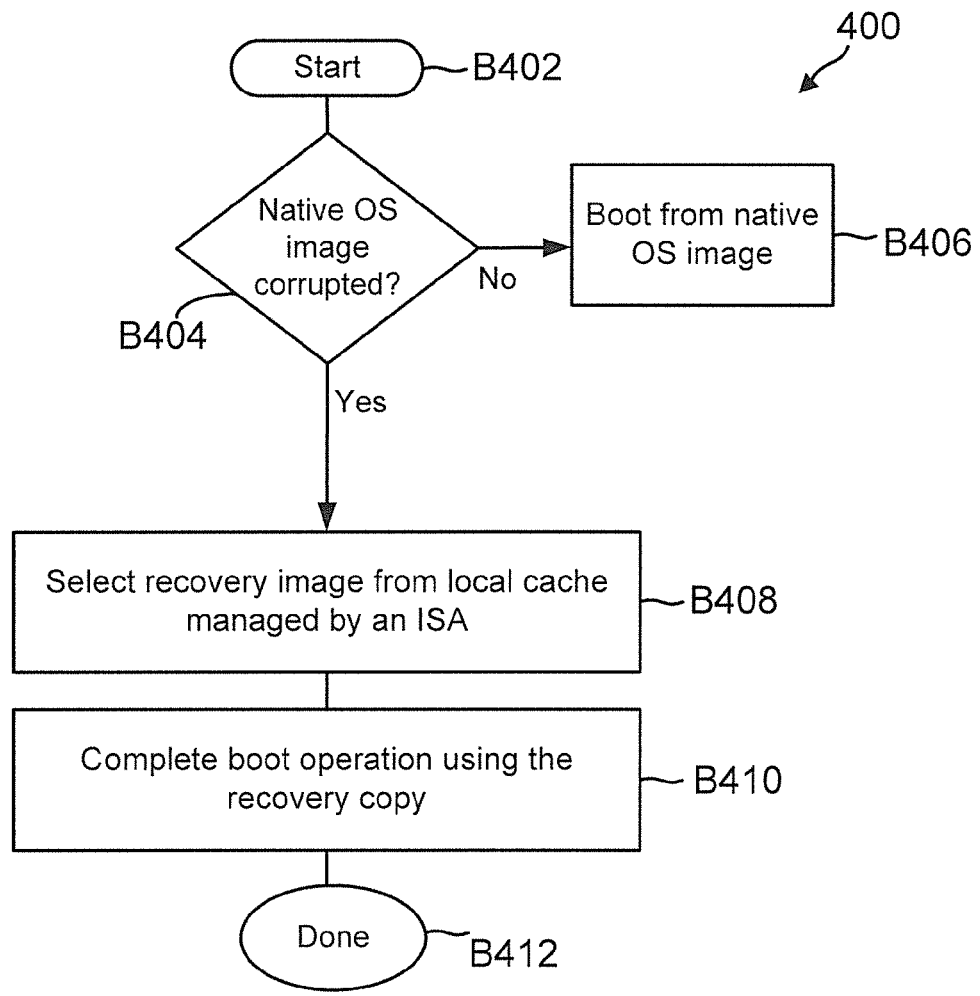

FIG. 4 shows a process flow 400 for recovering a crashed or corrupted copy of an operating system, according to one embodiment. The process begins in block B402. In block B404, the process determines if a native operating system copy is corrupt or has failed. If not, then the host system is booted using the native image, in block B406. If yes, then in block B408, a recovery image is selected from the local cache 148 that is managed by the ISA 114. The image that the user selects may be a fully configured version of the operating system, from a "fresh" installed version of the operating system. In one embodiment, the process allows a user to use a clone or a snapshot image of the operating system. Thereafter, the boot operation is completed in block B410 and the process ends at block B412.

In one embodiment, redundancy is provided for an operating system for a host computing system. The operating system is protected at a local cache managed by the ISA 114. Even if a primary image fails, the computing system can use a secondary image to boot. Because the user may not use the local cache to store data, it can be safely used to store operating system and an image of the operating system.

Although the present disclosure has been described with reference to specific embodiments, these embodiments are illustrative only and not limiting. For example, although the description above has been described with respect to an ISA, any other device may be configured to perform the foregoing function. Thus the term adapter and device are interchangeable. Many other applications and embodiments of the present disclosure will be apparent in light of this disclosure and the following claims. References throughout this specification to "one embodiment" or "an embodiment" means that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

What is claimed is:

1. A network device, comprising:
   a storage protocol controller having a port for interfacing with a storage area network (SAN) based storage device; and
   a processor executing instructions for managing a local storage device of the network device that is configured to operate as a caching device for a computing device; wherein the local storage device of the network device is used to store a recovery copy of an operating system of the computing device, where the recovery copy is accessible via a processor executable basic/input output (BIOS) utility;

wherein the recovery copy of the operating system is based on a user selectable option for storing an image of the operating system.

2. The network device of claim 1, wherein the recovery copy is accessed to boot the computing device, when a primary image of the operating system becomes unavailable.

3. The network device of claim 1, wherein the network device operates as a host bus adapter for processing input/output requests for reading and writing information.

4. The network device of claim 1, wherein the storage protocol controller is a Fibre Channel controller.

5. The network device of claim 1, wherein the network device presents storage space at the local storage device as a logical object to other computing devices.

6. The network device of claim 5, wherein the other computing devices use the local storage device as a caching device for caching information that is stored at the SAN based storage device.

7. A machine implemented method, comprising:
managing a local storage device of a network device that is configured to operate as a caching device and as a host bus adapter for accessing a storage area network (SAN) based storage device; and
using the local storage device of the network device to store a recovery copy of an operating system of a computing device, where the recovery copy is accessible via a basic/input output (BIOS) utility instructions executed by a processor out of a memory device;
wherein the recovery copy of the operating system is based on a user selectable option for storing an image of the operating system.

8. The method of claim 7, wherein the recovery copy is accessed to boot the computing device when a primary image of the operating system becomes unavailable.

9. The method of claim 7, wherein a storage protocol controller having a port interfaces with the SAN based storage device to provide access to SAN based storage.

10. The method of claim 9, wherein the storage protocol controller is a Fibre Channel controller.

11. The method of claim 7, wherein the network device presents storage space at the local storage device as a logical object to other computing devices.

12. The method of claim 11, wherein the other computing devices use the local storage device as a caching device for caching information that is stored at the SAN based storage device.

13. A non-transitory, machine readable storage medium, storing executable instructions, which when executed by a machine, causes the machine to perform a method, the method comprising:
managing a local storage device of a network device that is configured to operate as a caching device and as a host bus adapter for accessing a storage area network (SAN) based storage device; and
using the local storage device of the network device to store a recovery copy of an operating system of a computing device, where the recovery copy is accessible via a basic/input output (BIOS) utility instructions executed by a processor out of a memory device;
wherein the recovery copy of the operating system is based on a user selectable option for storing an image of the operating system.

14. The storage medium of claim 13, wherein the recovery copy is accessed to boot the computing device when a primary image of the operating system becomes unavailable.

15. The storage medium of claim 13, wherein a storage protocol controller having a port interfaces with the SAN based storage device to provide access to SAN based storage.

16. The storage medium of claim 15, wherein the storage protocol controller is a Fibre Channel controller.

17. The storage medium of claim 13, wherein the network device presents storage space at the local storage device as a logical object to other computing devices.

* * * * *